United States Patent [19]
Lindseth

[11] 4,210,968
[45] Jul. 1, 1980

[54] SEISMIC EXPLORATION TECHNIQUE

[76] Inventor: Roy O. Lindseth, 241 Eagle Ridge Dr., Calgary, Canada

[21] Appl. No.: 641,219

[22] Filed: Dec. 16, 1975

[51] Int. Cl.² ........................ G01V 1/28; G01V 1/36
[52] U.S. Cl. ...................................... 367/46; 367/47; 367/49; 364/421
[58] Field of Search ............ 340/15.5 CS, 1 F, 1 DP, 340/1 CF, 1 AF, 1 BH; 444/1; 364/421

[56] References Cited
U.S. PATENT DOCUMENTS

| | | | |
|---|---|---|---|
| 3,662,325 | 5/1972 | Savit | 340/15.5 DS |
| 3,671,929 | 6/1972 | Rurhle et al. | 340/15.5 DP |

OTHER PUBLICATIONS
Smith et al., "Computer Graphics in Geophysics," 10/72, pp. 825–838, Geophysics, vol. 37, #5.

Primary Examiner—Nelson Moskowitz
Attorney, Agent, or Firm—Roylance, Abrams, Berdo & Farley

[57] ABSTRACT

A method of producing a display of acoustic velocity characteristics of individual strata in a geologic section includes propagating broad-band acoustic energy into the earth, detecting reflected energy from multiple strata at an array of receiving stations, recording the received signals, normalizing the signals representing the energy received from each strata interface for losses due to the strata above that interface to restore the signal levels and to derive a sequence of loss factors, filtering the low frequency signals from the resulting signals, adding to the resulting filtered signals a set of gross velocity profile signals and displaying the results.

5 Claims, 11 Drawing Figures

SEISMIC EXPLORATION TECHNIQUE

This invention relates to seismic exploration of geologic formations and, more specifically, to an improved method of determining acoustic propagation characteristics of strata in a geologic section.

BACKGROUND

An acoustic well log is a continuous piecewise measurement of the vertical velocity within the sediments by a borehole. Formation velocities are measured directly by a tool lowered down the borehold on a precisely calibrated cable so the precision of measurement is fairly constant at any depth. Studies made by a committee of the Canadian Petroleum Association and others demonstrates an acoustic log to have a resolving power of about one foot of formation thickness or less, and to detect velocity change of 1%.

Each of the units in a sedimentary column falls within a relatively narrow, but not necessarily unique, range of velocities. Thus, measurements of the velocities can provide some indication of the nature of sediments penetrated.

Changes in the characteristic velocities are also very important. Sudden changes in velocity mark the boundaries of stratigraphic units, enabling geologists to correlate stratigraphy from location to location, and thereby to construct maps of the several subsurface units.

A decrease in velocity within a unit can be diagnostic of increasing porosity, a favorable condition for a petroleum reservoir formation, and a further reduction may indicate the presence of hydrocarbon, in particular natural gas, within the reservoir formation.

For these, and other reasons, the acoustic well log is a valuable tool for the petroleum geologist, and forms one of several measurements of natural physical phenomena associated with the earth's crust which are usually made in any hole drilled for petroleum.

Seismic reflection surveying is another petroleum exploration tool in common use. The typical procedure is to detonate a small explosive charge buried a few feet below the earth's surface. Sound waves from the explosive radiate through the earth's crust and are reflected much like an echo from formation boundaries back to the surface, where their arrival is detected by extremely sensitive seismometers. Accurate measurement of the time between the initial pulse and the arrival of the reflected energy provides a means of estimating the depth to the reflector.

In practice, the information detected by the seismometer is recorded continuously for several seconds following the detonation of the explosive. In this manner, echoes from several beds are obtained in a continuous sequence. Repeating the process at several locations permits continuous, simultaneous mapping of several of the major geological units that make up the earth's crust.

The seismic measurements are in units of time, commonly milliseconds. The reflection times of seismic events are normally measured to one millisecond precision. Since the reflection is a two-way time, down and back, it should be possible to measure depth changes of 0.5 millisecond. At an average velocity of precisely 10,000 feet per second, this should provide the ability to measure differences in depth as small as five feet.

Determination of the absolute depth to a given formation can be made only if the velocity of seismic waves through the earth at that point is known.

Very precise velocity information can be obtained from the acoustic log, but this requires drilling a deep borehole. Much less precise velocity measurements have been made from the surface by recording the seismic reflection from a common subsurface point at two separate locations. The difference in travel times between two receivers separated by a known distance can be used to solve for velocity by simple trigonometry. However, the results are only approximate at best, and may be distorted by anistrophy within the earth and aberration in the travel paths followed by the energy to the two observation stations. Subsurface velocities obtained from the surface by this method have rarely been more accurate than about 2%, or 200 feet in 10,000 feet, and are very insensitive to sudden change.

Therefore, although the seismic method may be able to measure relative structural elevation changes with considerable precision, it has not been very precise for absolute depth measurement.

Furthermore, the resolution of individual subsurface geologic units by the seismogram is rather limited. The ground acts as a frequency filter of seismic waves. Often the upper limit of useful returning seismic frequencies on conventional seismograms is limited to about 50 Hertz. Seismic waves may contain weak components up to approximately 100 Hertz, but these are normally discarded. A signal having a frequency of 50 Hertz has a period of 0.020 second. At a velocity of 10,000 feet per second, the wavelength of that signal becomes 200 feet. Thus, at best, a seismic wave must travel down and back through a bed of at least 100 feet thickness in order to distinguish it from an adjacent bed. The results of normal production surveys probably have reliable absolute resolving powers of only about half of the ideal, say 200 feet. The presence of much thinner beds, to about $\frac{1}{8}$ wavelength or less, may be detected but thier thickness cannot be precisely measured.

Thus, although the acoustic log and the seismic reflection trace both measure acoustic properties of the sedimentary section, the seismic information cannot provide the detailed resolution of thin beds nor of velocity changes possible to measure with the acoustic log. The seismic method does have the great advantage that measurements can be made from the earth's surface without the need to drill a deep borehole. However, due to its limited powers of resolution of velocity and bed thickness, its application has been limited almost exclusively to mapping the shape of subsurface structure by measuring reflection travel times.

The seismic signal is usually distorted in its travel through the earth, and often buried in noise. The quality and resolution of production seismic field data may be considerably degraded by this distortion and noise.

A common procedure which has been applied to the signal to improve its quality is bandpass frequency filtering. Of the serveral types of noise which may be present in a seismic signal, the two most common are broadband random noise and low frequency near-surface noise waves produced as a by-product of the source energy. Of the two types, the low frequency energy say below 15 Hertz often is the strongest and may completely overwhelm the signal.

At the other end of the frequency scale, ground effects normally cause a rapid increase in attentuation of seismic reflection frequencies above 40 Hertz. Random noise may be fairly uniform in amplitude across the frequency spectrum but very commonly increases in strength at higher frequencies. In either case, although the seismic signal amplitude may be strong at frequencies below 40 Hertz, above that point it falls rather quickly, so that at some point, say 60 Hz., it will fall below the amplitude level of the noise. Quite frequently, the presence of the seismic signal may be made more obvious by eliminating all frequencies above that point where the noise level is greater than the signal.

As a result, conventional seismic data is commonly limited to a bandwidth of about 15 to 55 Hz., or just under two octaves bandwidth.

For use in structural mapping, frequency band limiting of a seismic signal to reject noise is often a very effective procedure, leaving the signal in the remaining portion of the spectrum sufficiently free of noise to enable clear definition where none could be detected before.

From a theoretical standpoint, however, application of a bandpass filter to a seismic signal reduces its information carrying capacity. The information capacity of any signal is a product of its time duration, frequency bandwidth, and amplitude. During the past decade, many specialized field data acquisition instruments and techniques and procedures have been developed to improve seismic data quality by eliminating noise and correcting signal distortion.

One highly successful technique, termed stacking, patented by Mayne (U.S. Pat. No. 2,732,906), records in the field several redundant observations of the same subsurface point. After suitable adjustments and corrections, the several observations are summed and averaged, to cancel noise and enhance the signal. This procedure is often effective in extending the range of useful frequencies above the normal limit of 50 Hertz found on conventional seismic data.

One of the principal digital procedures applied to enhance seismic data is termed deconvolution. Briefly, this procedure uses mathematical least-squares techniques to determine, under certain assumptions and within certain limiting constraints, the probable distortion and attenuation that has occurred to the frequency spectrum of a seismic signal in passage through the earth. From this determination a correction is calculated and applied to the signal to compensate for the distortion, and attenuation. When this process is applied to stacked data useful high frequency information can be developed, and the resolution of the seismic signal is often improved. The relative effects of the bandwidth reduction upon a signal already having limited resolving power is often given little attention. At present, of the foregoing components of the signal, only the component of time is used to any great extent.

For use in structural mapping, frequency band limiting of a seismic signal to reject noise is often a very effective procedure, leaving the signal in the remaining portion of the spectrum sufficiently free of noise to enable clear definition where none could be detected before.

The third component, amplitude, has also generally been ignored. In most processing it is merely set to a constant or nearly so.

In U.S. Pat. No. 3,671,930, Mateker, Jr., there is disclosed a method of exploration using seismic techniques wherein an amplitude-time recording of reflections from strata is made. This recording function is divided by a second recording function converted into a reflectivity function, and the logarithm of the result is derived to approximate a function representative of the pattern of velocities through the strata in the geologic section. This technique is based on the assumption that the amplitude of the acoustic signal passing through the strata decreases exponentially with time (depth). While this assumption leads to a good approximation and provides better information than previous techniques, the assumption is only completely valid in sections where the reflection coefficient of interfaces between strata are equal to each other or follow a definite pattern, conditions which are seldom fully met. Also, the procedure measures ratios only, and many combinations of sediments produce similar ratios. In another recent development, sudden extreme changes in seismic reflection amplitude are related to the pressence of gas in the formation.

BRIEF SUMMARY OF THE INVENTION

The present invention is directed to an improved method of producing a display of the relative acoustic propagation characteristics of individual strata, i.e., velocity characteristics, in a geographical section. The method utilizes all signal components of time, frequency and amplitude. It includes the steps of propagating acoustic energy through the section from a surface transmission station, detecting at a first surface receiving station acoustic energy reflected from interfaces within the section, recording signals representative of the amplitude of the received acoustic energy as a function of time, compensating the signals representative of energy reflected from each interface for the transmission losses due to transmission through the strata about that interface, applying deconvolution to compensate the frequency spectrum for distortion, filtering the compensated signals to remove signals having frequencies below a preselected threshold, integrating the remaining frequencies to produce velocity coefficients, detecting at a second surface receiving station acoustic energy reflected from the same interfaces within the section as recorded at the first receiving station; the second receiving station being located at the surface of the earth and at a significantly greater distance from the transmission station that the first receiving station, recording signals representative of the amplitude of the acoustic energy received by the second station as a function of time, determining subsurface velocity coefficients from the geometric distortion of the arrival times of the signals recorded at the second station, filtering the velocity coefficients derived from the signals received at the second receiving station to remove velocity coefficients having frequencies above the preselected threshold to produce velocity coefficients representing a velocity profile of the section, adding the velocity coefficients of the compensated filtered signals from the first station to the filtered velocity coefficients from the second station, and displaying the resulting velocity signals.

In order that the manner in which the object of the present invention are attained can be understood in detail a particularly advantageous embodiment thereof will be described with reference to the accompanying drawings, which form part of the specification, and wherein.

For sound waves having near vertical incidence, acoustic impedance is very nearly a direct function of velocity according to the relationship $$Rc = (V_2 - V_1)(V_2 + V_1) \quad (1)$$

wherein Rc is the coefficient of reflection at an interface between strata, and V is velocity.

The subscripts 1 and 2 are used to identify upper and lower adjacent strata, respectively. Equation (1) can be rearranged so that $$V_2 = V_1 (1 + Rc)/(1 - Rc) \quad (2)$$

for more precise determination, the effects of density (which is very nearly a constant function of velocity) can be included in equation (2) as a scaling factor for purposes of explanation to give:

$$KV_2 = V_1 (1 + Rc)/(1 - Rc) \quad (3)$$

At any acoustic boundary or interface within the geologic section if a signal having an amplitude of 1.0 impinges, a portion of the signal having an amplitude of Rc will be reflected back toward the surface. The remaining signal having amplitude 1-Rc will continue through the next strata to be partially reflected at the next interface.

Figure 1:
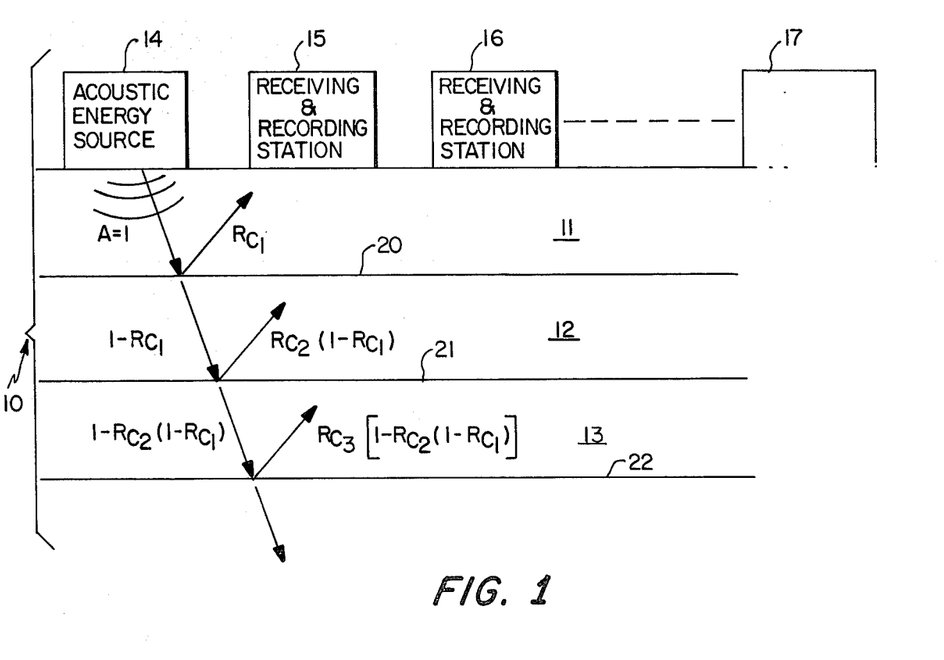
FIG. 1 is a schematic diagram of a simplified geologic section showing a plurality of strata and a simplified arrangement of an acoustic source and geophone array.

Referring now to FIG. 1, there is shown a much simplified diagram of a geologic section 10 having strata 11, 12 and 13. An acoustic energy source 14 is located as a transmission station near the surface above the region to be explored. Source 14 is a conventional broad spectrum source such as, for example, dynamite. While the source may extend into a shallow hole as is commonly the case with dynamite, it can be regarded as being at the surface.

Spaced from source 14 along the surface of the earth are acoustic energy receiving and recording devices 15, 16 and 17 which include geophones. These geophones are conventional in nature and are selected to respond to a wide frequency band to produce electrical signals over the frequency band of interest, i.e., from as low as about 5 Hz. up to 100 Hz. or higher. Units 15, 16 and 17 also include recording devices, capable of producing an amplitude recording of the signals representative of received acoustic energy reflected from strata in the geologic section over the entire available signal band. Typically, all geophones in the array are recorded by a multiplex or multichannel technique on magnetic tape, and this can advantageously be done in digital form, in which case the stations 15-17 would also include a direct digital recorder having binary gain or floating point amplifiers capable of recording the full amplitude range (120 db) of the seismic signal. An example is the Texas Instruments Model TIAC DFS III, IV or V, or equivalent. No instrument filters are used. It should also be noted that the geophone array itself is arranged in a conventional manner. These acoustic transmission, reception and recording techniques are conventional in nature and will not be further described. As previously indicated, if a unit amplitude acoustic wave is progated into stratum 11 by source 14 and encounters an interface 20 between strata 11 and 12 having a reflection coefficient $Rc_1$, a signal having amplitude $Rc_1$ is returned towards the surface and a signal having amplitude $1-Rc_1$ continues on through stratum 12. If the next interface 21 has a coefficient of reflection $Rc_2$ then a signal $Rc_2(1-Rc_1)$ is reflected back towards the surface and a signal $1-Rc_2(1-Rc_1)$ continues into stratum 13, toward interface 22, and so forth.

Figure 2:
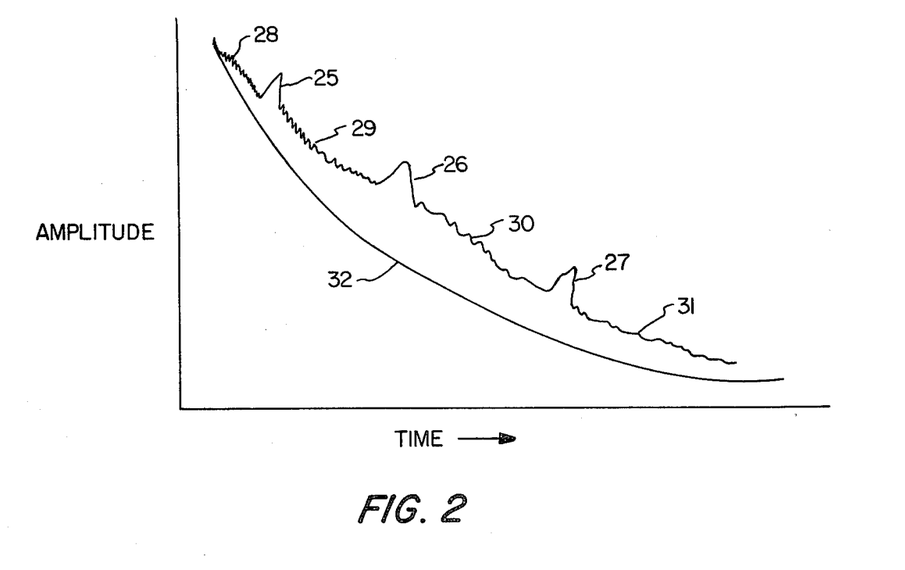
FIG. 2 is a schematic block diagram of a system for processing seismic data according to the present invention.

From this it will be observed that an amplitude-time recording of electrical signals received by one geophone from plural interfaces would generally resemble FIG. 2 if plotted in analog form wherein there is shown a simplified graph of amplitude versus time. The approximate graph of this figure illustrates major reflections 25, 26 and 27 from events such as interfaces 20, 21 and 22, with smaller amplitude variations in portions 28–31 resulting from relatively minor reflections within the strata. It will also be noted that the average slopes of portions 28–31 differ from each other as functions of the velocity characteristics of the individual strata.

Also shown in FIG. 2 is an exponential curve 32 of a type which can be and has been used as an approximation to an amplitude-time curve of this type. It will be seen that while this form of approximation can be made to fit reasonably well under some circumstances, significant deviations can occur and it will not be known where such deviations exist or are most significant.

In accordance with the present invention, that data recorded by the equipment described with reference to FIG. 1 is operated on to compensate for signal amplitude lost at each interface and through strata above that interface by multiplying the various values for signals between interfaces by factors proportional to the Rc values of the strata. Thus, if the amplitude of the input signal is normalized to 1, the initial returning reflection has an amplitude of $Rc_1$ and the signal continuing on through to be reflected from the next layer will be $1-Rc_1$. The signal proceeding towards the next interface can then be normalized to 1 and the same calculation reiterated to correct for all transmission losses.

Following suitable processing and scaling, velocity coefficients may be calculated. In the case of the first reflecting boundary, the ratio between the amplitude of the input signal and the initial reflection is a direct means of $1/Rc_1$, i.e., of the acoustic impedance across the first reflecting boundary. The velocity characteristics $V_1$ of the upper stratum can be measured directly at the surface or estimated and later adjusted by multiplying all results by an appropriate scaling factor. Thus, the velocity characteristic of the second stratum can be calculated directly from Equation (3). The same calculation can be reiterated to find $V_3$, etc.

Figure 3A:
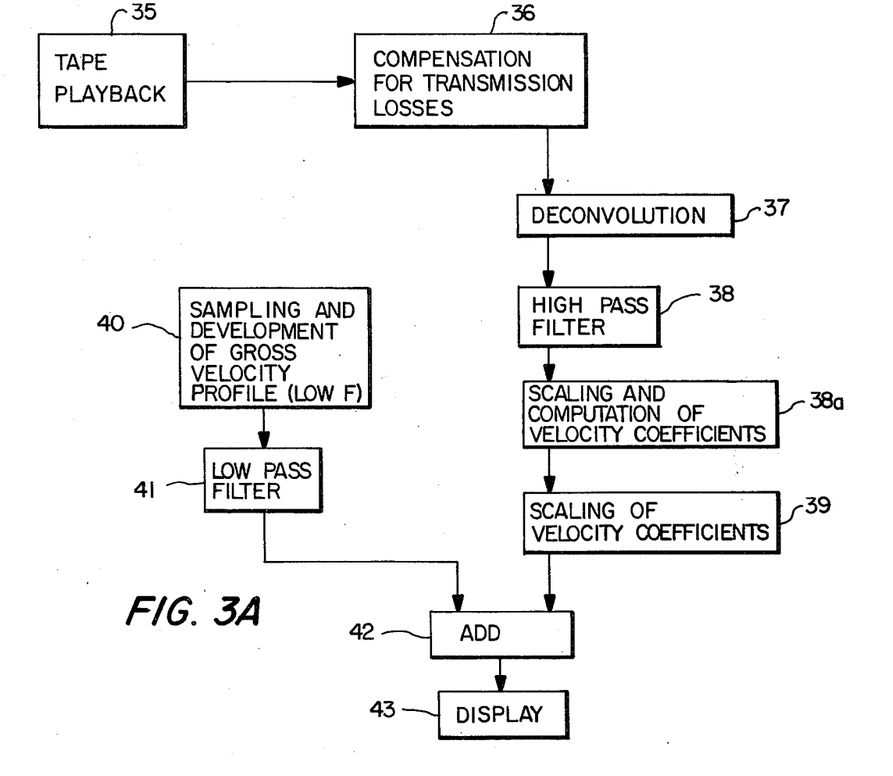
FIG. 3a is a simplified block diagram of an apparatus for performing the method of the present invention.

A simplified schematic block diagram of a system for performing the method of the invention is shown in FIG. 3a. The processing of the data is to be performed using standard general purpose computing equipment and flow diagrams illustrating the steps in more detail are shown and will be described with reference to Figures. However, the overall operation of the system can be seen in FIG. 3A wherein the data on the magnetic tape produced in the field is played back (35) into the processing equipment. As previously indicated, this data includes amplitude-time signals from at least one, but usually an entire array, of geophones. The signals are compensated for transmission losses to normalize the signals to a selected level as indicated in block 36. The resulting compensated signal can then be processed through a deconvolution or inverse filtering step 37 to separate individual signals particularly in those situations in which multiple signals and reflections overlap.

This operation of deconvolution or inverse filtering is generally a well understood process and is, in itself, widely used in seismic signal analysis. The exact deconvolution model employed in this step depends upon the geologic area being explored, and models for various geographic areas have been developed and are available. Much literature on the subject is available and no detailed discussion or disclosure of specific routlines for performing this step is necessary herein. For suitable detailed information on this topic reference is made to a collection of technical papers entitled, "The Robinson-Treitel Reader," 3rd Edition (1974) published by Seismograph Service Co., a subsidiary of Raytheon Corp., P. O. Box 1590, Tulsa, OK.

The deconvoluted data is then filtered, step 38, to remove low frequences below a predetermined frequence threshold which is usually about 5 Hz. but can be in a range from about 2 Hz. to about 8 Hz. The reason for this filtering will be further described.

In step 38(a) and 39 the amplitude of the entire signal is scaled by a factor which is a function of velocity to bring the data to a level appropriate for determination of the velocity coefficients. It may be seen from (1) that Rc must always lie between +1 and −1. If this correction was not introduced, the amplitudes of the velocity signals would be misleadingly large. A suitable correction is a factor applied to the RMS values of the signals introduced. Velocity coefficients are then calculated according to (3), and any required scaling factors to compensate for density or velocity are applied to the results.

In a parallel operation, the data is sampled at a suitable rate to produce a gross velocity profile of the entire geologic section being explored, step 40. The result of this operation is a primarily low frequency signal which has excursions representative of the gross velocity changes from one stratum to the next. The resulting signal is filtered in step 41 to remove all frequencies about the previously determined threshold (2–8 Hz) and is added in step 42 to the signal produced in step 39. The added signal is then displayed directly in step 43 or is converted to another form and then displayed.

The development of the two signals above and below the threshold level and the subsequent adding of these signals is an important aspect of the present invention. The need for this arises from the physical limitations of the system and the acoustic energy source. Ideally, one would like to transmit a very sharp unit impulse into the earth, but because of the nature of the sound source and because the charge hole has elastic properties, the transmitted pulse has a characteristic resembling a damped sinusoid with a duration of, typically, 80–100 milliseconds. A mirror image of this pulse is reflected at an amplitude diminished by the factor Rc, as previously discussed.

If two interfaces are very close together, the second echo mixes with the first so that the geophone sees a resultant signal rather than two clearly distinquishable signals. For this reason, a deconvolution technique is used.

Figure 3B:
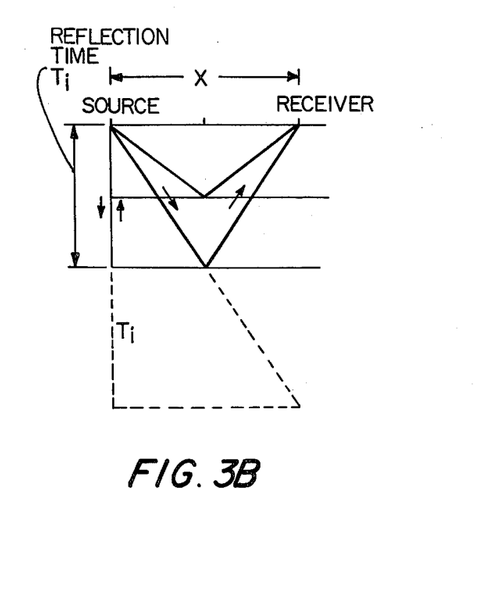
FIGS. 3b and 3c are diagrams used in explanation of the operation of a portion of the apparatus.

In this technique, the signal is regarded as a Fourier transform signal which is put through a model having a transfer function to obtain a replica of the input pulse. In deconvolution, there is a physical limitation which dictates that the output cannot contain components which did not exist in all inputs to the system. The output is therefore band limited. This reflects the physical limitations of the system in which one can record in the range from about 5 Hz. to about 100 Hz., but in which the low frequencies below 5 Hz. are restricted, partly due to the limitations of the geophones. But, as previously indicated, the low frequencies are very important. If one considers a seismic system in which an impulse is transmitted into and received from the earth, one can draw a right triangle (FIG. 3b) in which the altitude is t and the hypotenuse is the distance from the source to the point of reflection. If one then extends this triangle so that the altitude is 2t, the hypotenuse becomes a length equal to (2t=Δt), the symbol t indicating travel time. The increment t is the elapsed time due to the slant path of the reflected energy. If the base of this triangle is designated X, and if the hypotenuse and altitude are multiplied by V indicating velocity, one can write a relationship and solve for velocity which is $$V = X/\sqrt{\Delta t^2 + 2t\Delta t}$$

Figure 3C:
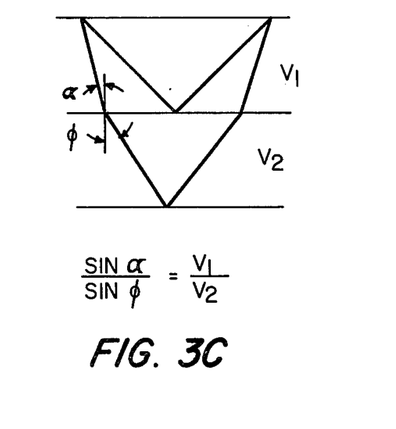

This relationship can be solved for each strata (FIG. 3c) giving the slant angle for the reflections to various strata to correct for aberrations in the path length for each wave of reflected energy. According to Snell's law, the angles for these reflections are not the same, but the ratio of $V_1:V_2$ is equal to Sin $a_1:a_2$, which permits the solution to be accomplished reiteratively by digital data processing equipment.

Figures 4, 9:
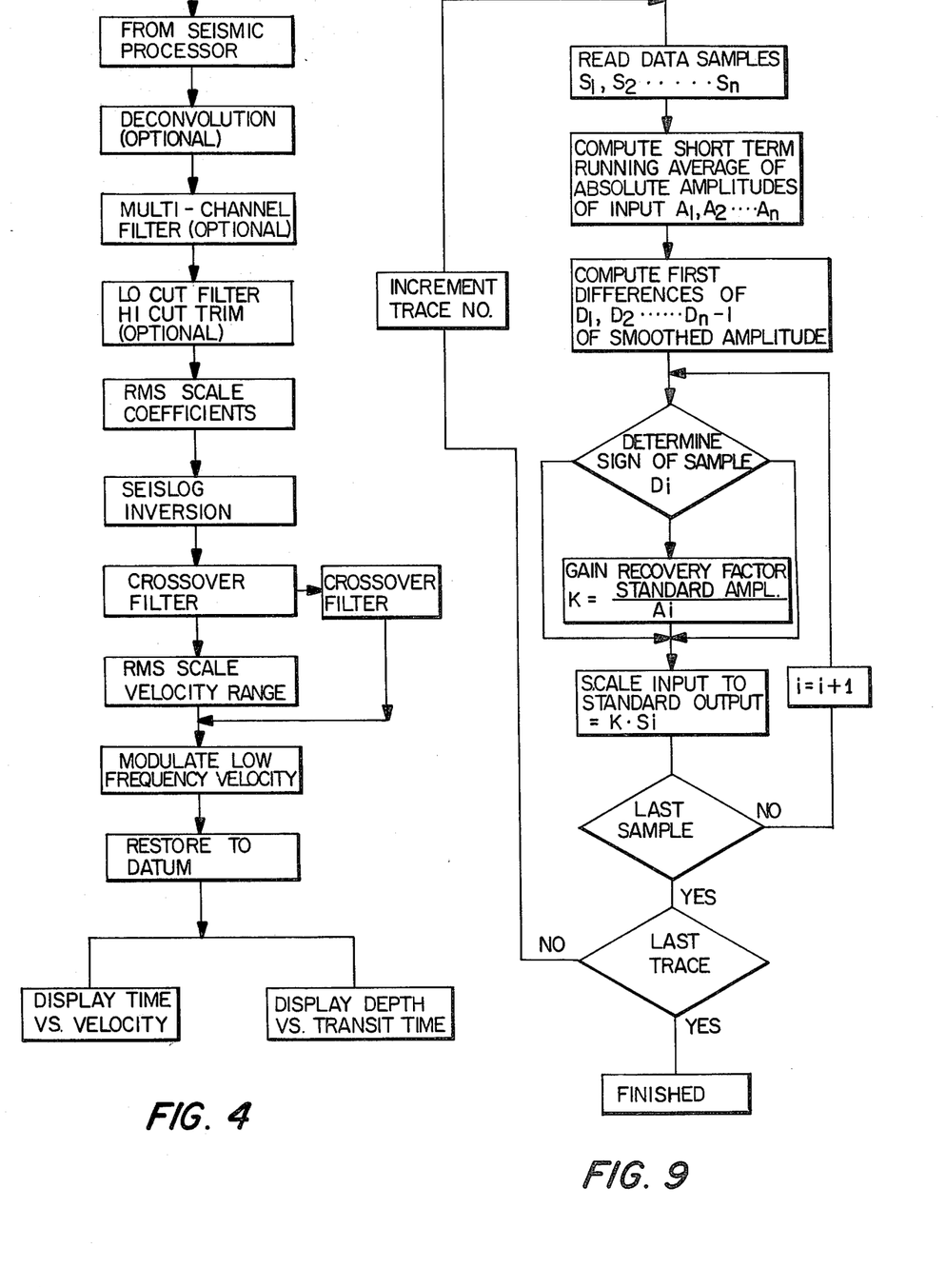
FIGS. 4–9 are flow diagrams showing, in greater detail, the steps of the method in accordance with the invention.

Turning now to the processes which are usable in a practical processing system for performing the method of the invention, FIG. 4 is provided as being a general block diagram of which various portions will be discussed in detail. As will be seen, the result of the processing can result in a conventional display of time vs. velocity and can also be used to produce a display of time vs. transit time in accordance with the present invention.

Figure 5:
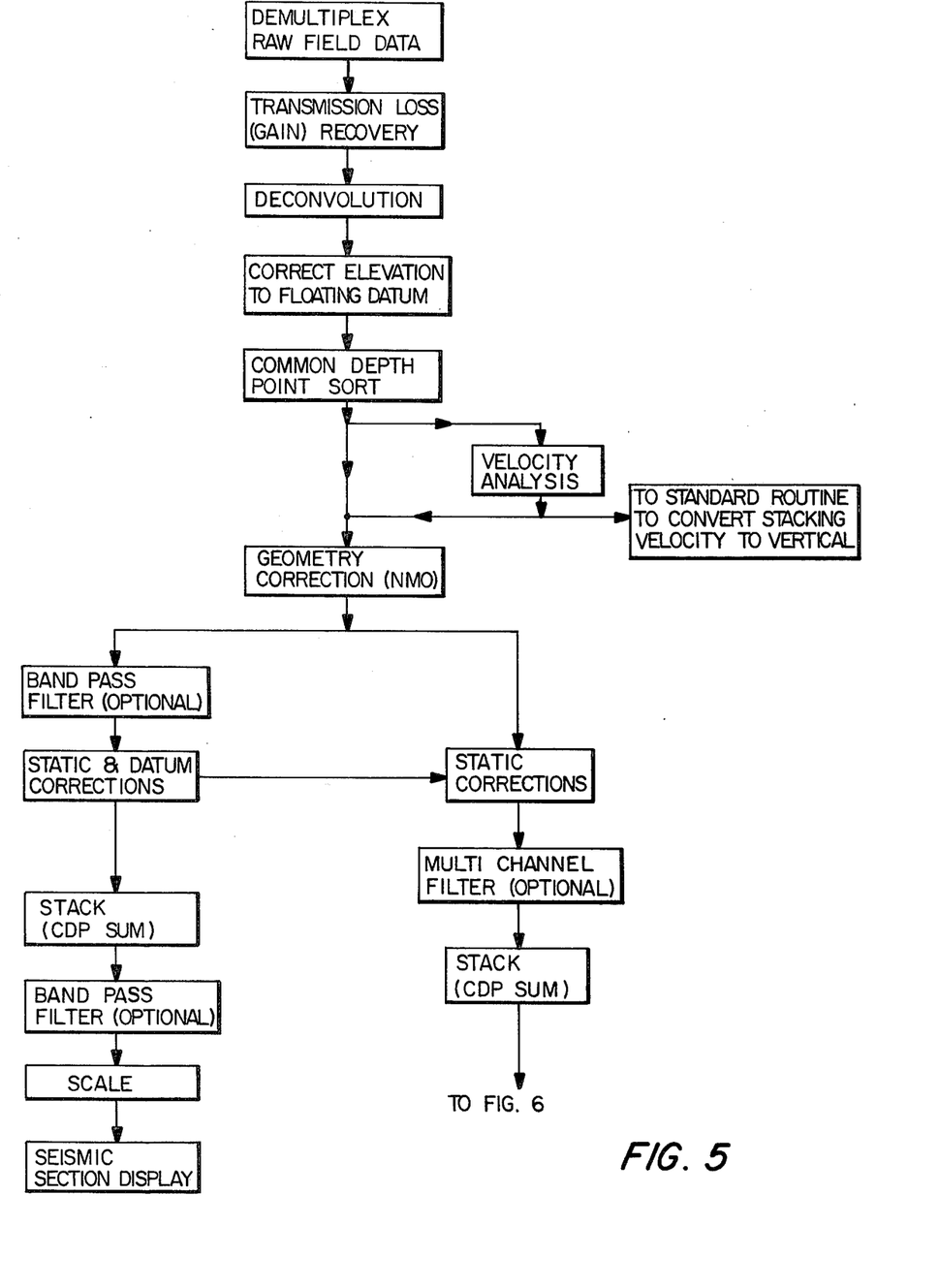

FIG. 5 shows a more detailed basic data flow for each seismic field trace to the final output. It will be recognized by those skilled in the art that many of these steps employed herein are conventional in nature and are commonly employed in processing seismic data. Also, many of these steps are optional and would not necessarily be employed for processing all data, this omission or accomplishment of various steps also being conventional in seismic data signal analysis. However, for the sake of completeness, these various steps are incorporated to indicate to those skilled in the art the manner in which the various steps are inter-related.

As shown in FIG. 5, the data is first demultiplexed. Seismic data is normally recorded in multiplex fashion on 24, 48 for 96 channels. The demultiplex operation converts the input to separate individual trace channels. The demultiplexed raw field data is then subjected to transmission loss recovery, which step will be further described in connection with FIG. 9. As previously indicated the seismic signal loses amplitude in its passage through the earth for several reasons. It is necessary at this stage to compensate the signal for transmission losses and thus approximate a signal without these losses.

The compensated signal is then deconvoluted. The devonvolution process modifies the frequency spectrum to compensate for frequency attenuation and/or distortion suffered in passage through the system. Several deconvolution techniques are available, the preferred technique being a frequency domain deconvolution in which amplitude and phase are modified according to predetermined parameters. Other methods may be used. The deconvoluted data is then corrected for elevation to a floating datum level. Local variation in the elevation of recording stations are corrected to a smoothed datum which follows the approximate surface of the earth. The correction is usually a small time shaft, called an elevation static, which compensates for elevations above or below the floating datum surface.

The data thus corrected is then sorted to a common depth point. Modern seismic data gathering techniques utilize a redundancy of observations of a single subsurface position. These observations are averaged to produce a maximum likelihood response. The redundant observations are recorded in common source position groups and sorted at this stage according to common subsurface positions by a convenient and conventional computer gathering process.

At this point it is often necessary to determine proper velocities to correct for geometrical offset between the source and receiver. These velocities are known as stacking velocities. Several standard velocity programs are available for this purpose. The results of the velocity analysis are used in two ways. They are transmitted to another processing routine (FIG. 8) which converts stacking velocities into vertical velocities for purposes of the present invention and, at the same time, are returned to the main processing stream to calculate the geometrical time corrections to be applied to the data samples of the seismic trace.

The data is then subjected to geometry correction for normal moveout (NMO). Increasing the distance between the source and the receiver to develop new travel patterns for the same subsurface point introduces a time distortion in the traces which varies with time and the separation between the source and the receiver. It also depends on the acoustic velocities in the materials through which the seismic signal passes. This processing step compensates for these variations in a geometrical correction, commonly known as NMO.

Following this stage, the process sequence is normally separated into two general streams, one for standard seismic sections and the other for displays in accordance with the present invention.

In the standard seismic data stream, the data is bandpass filtered to allow the processing specialist to evaluate the relative quality of the processing up to this point. The filtered data is then subjected to static and datum corrections. The previous corrections for elevation correct the traces to a floating datum which is close to the surface of the ground but which is not necessarily horizontal. It is frequently desired to correct to a horizontal or flat datum and, if such is the case, the correction is applied at this stage in the process. Trim corrections, known as trim statics, may also be applied to accurately align the several observations of a single common depth point.

When all corrections are applied, the several redundant observations, or traces, are summed to produce a single seismic trace representing the best estimate of the true nature of the signal at that point on the earth. This is known as stacking. Then, a bandpass filter is normally applied to the data to eliminate any residual noise and obtain a desirable final section. The signals can then be scaled to a higher amplitude at this stage, after which the resulting data is displayed on photographic film or paper.

Turning now to the stream for producing a display according to the present invention, the trim statics produced in the standard stream are transferred and applied to the novel data stream. Only the trim statics, however, are used; corrections to a flat datum are not included. The data thus corrected is then applied to a multichannel filter if the data contains excessive noise or unwanted signals which can be removed by velocity filters. The data is then stacked in a process substantially identical to the stacking process referred to in the conventional processing channel. The resulting stack at this stage is a corrected hi-fidelity broad band stacked seismic signal which can be used to develop the display of the present invention.

Figure 6:
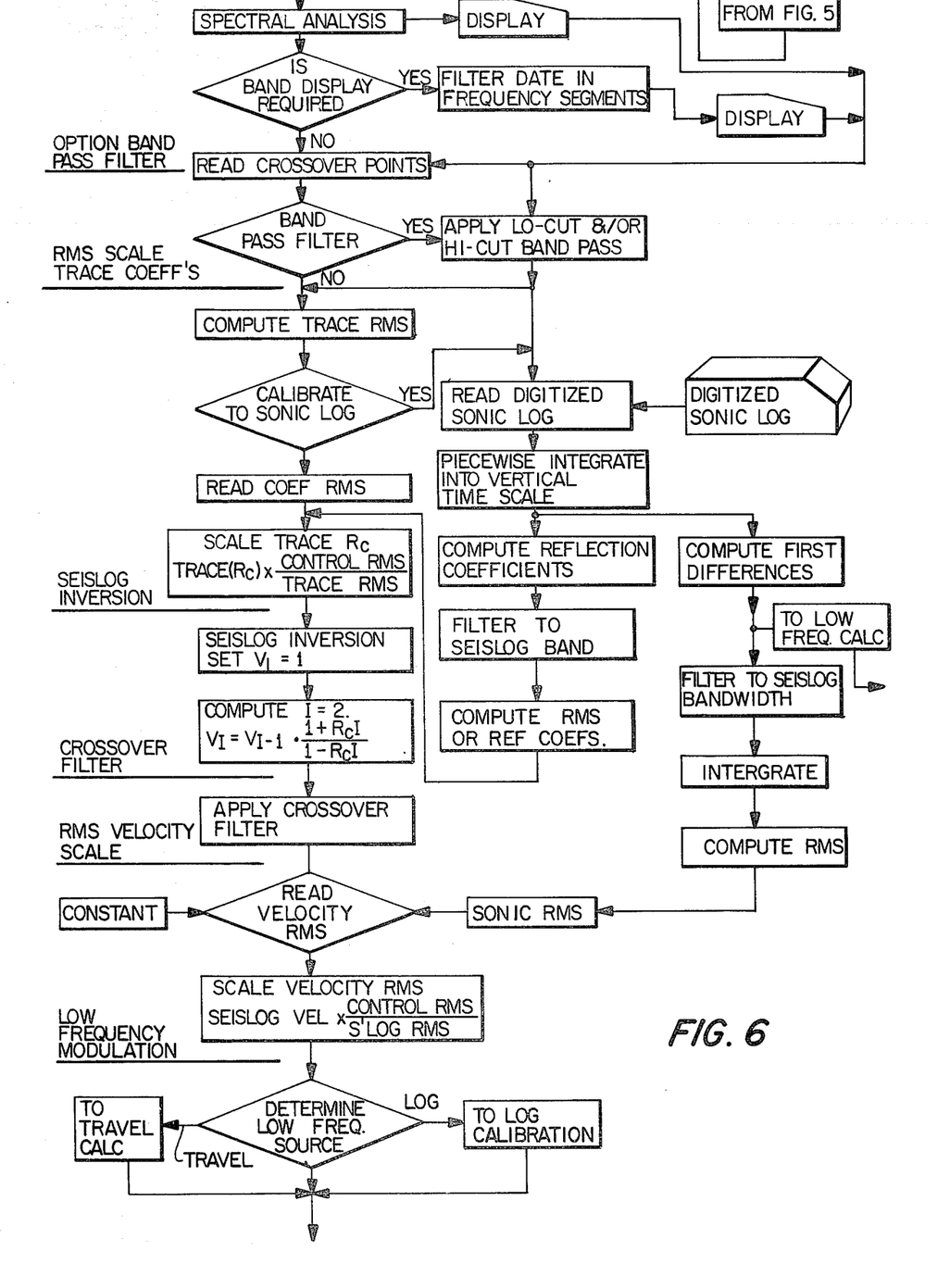
Figure 7:
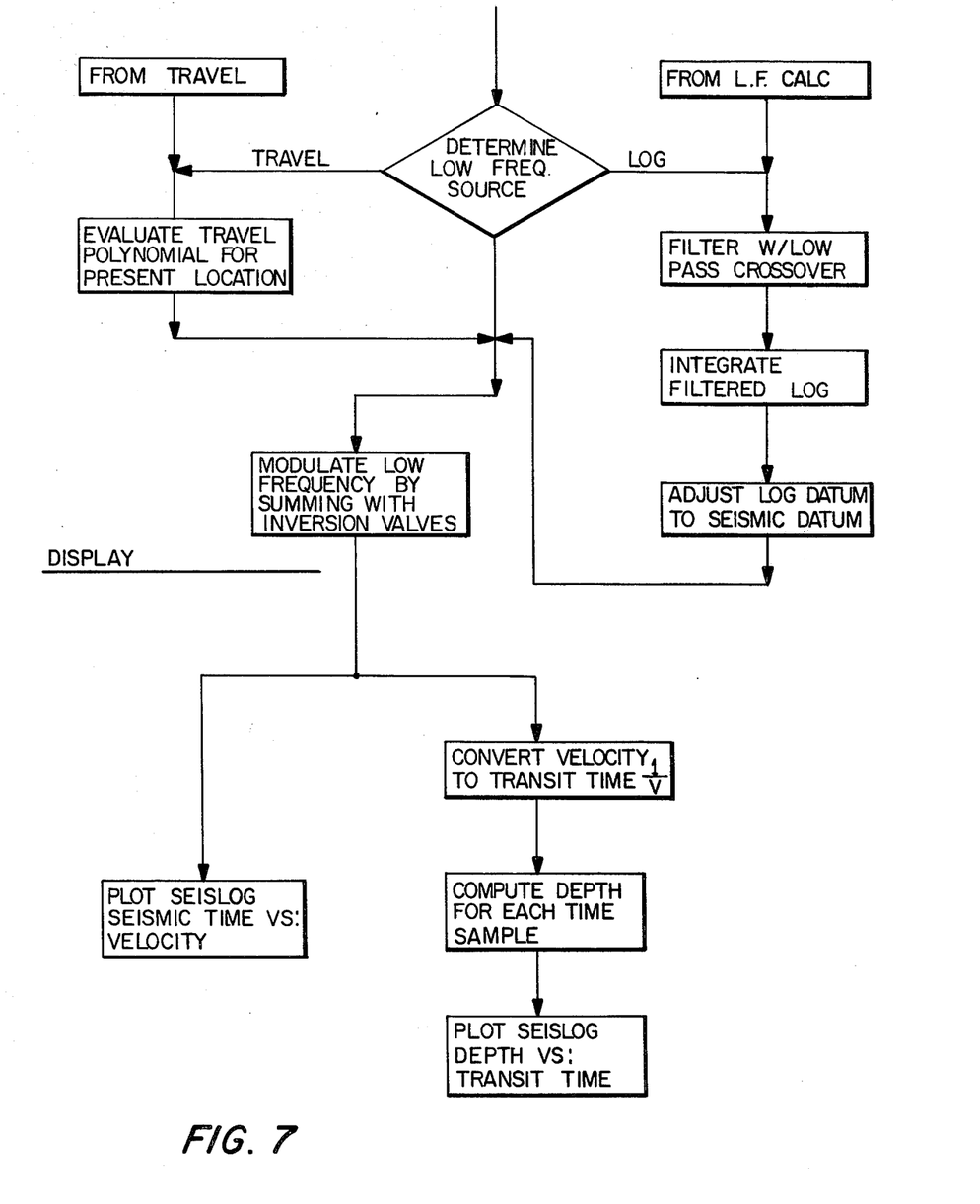

This data stream is continued on FIG. 6. In the first step on that figure is the optional step of spectral analysis which can be used to examine the relative frequency content of a trace. This can be developed at this stage and displayed for the data processing interpreter. It should be noted that, although this spectral analysis determines the complete frequency content, it may not be sufficient to indicate the source of the frequencies as to whether they are derived from a usable signal or from noise.

A decision is then made about whether it is necessary to further analyze the data at this stage. If the interpreter requires further analysis, a representative set of traces is filtered through several narrow band filters and displayed, in turn, in trace form. From this display, the interpreter can judge whether a given set of frequencies is mostly signal or mostly noise. The processes of spectral analysis and of band display can optionally be repeated for several representative sets of traces for any given project.

The next step is to set crossover points. The analysis of the previous two stages, or simply the experience of the interpreter, can be used to set the crossover point below which frequencies will be derived from velocity measurements and above which frequencies will be derived from the seismic trace in developing the display according to the present invention.

Next under certain circumstances, which may be determined by the previous analyses, the interpreter may decide that certain portions of the spectrum will contribute nothing to the resulting display. If so, these frequencies are removed by a bandpass or band reject frequency filter which can be designed to reject the low frequencies, the high frequencies or both.

The reflection coefficient RMS amplitude is next determined. The highly deconvolved trace obtained from the previous seismic processing is assumed to represent a set of reflection coefficients. These will have a root mean square (RMS) value which is related to some standard value for the geologic area under an examination. This standard value can be determined by computing the root means square value of the actual reflection coefficients obtained from a borehold sonic log, or, alternatively, it may be arbitrarily set using experience derived from particular types of sections.

To calculate the RMS at a control point a digitized sonic log is read into the program. This is integrated, to obtain a linear time scale, and from this the reflection coefficients are calculated. These are then filtered to the seismic frequency band and the RMS of the filtered coefficients is computed and returned to the main program. This auxiliary procedure is normally done only once for a specific project.

The scale trace reflection coefficients are then established. The ratio between the RMS of the input data and the calibration RMS is computed and used to scale the input trace, bringing the trace RMS to the standard value.

The next step is SEISLOG inversion. The SEISLOG inversion process requires an initial velocity (the constant of integration) to be known. At this stage, it may not be known so the initial value is set to unity.

The velocity ratios are then computed. For each sample on the trace the relative velocity is calculated by the procedure indicated in the flow chart box. The result of this operation is a series of relative velocities which, when multiplied by an appropriate scaling factor, will produce the series of SEISLOG velocities.

The crossover filter is then applied. The crossover filter determined for the project, as described above, is applied at this stage with all frequencies below the crossover point being rejected from the SEISLOG trace.

The SEISLOG velocities at this stage are only relative, and they must be scaled to the proper level to modulate the low frequency which will be subsequently added. The appropriate scaling factor, determined once for an area, may be a constant inserted by the interpreter or may be determined by calibration to a sonic log if one is available for the region.

If the calibration is to a log, the previously integrated calibration log is filtered to the crossover frequency on the low side and to the cutoff frequency of the seismic input data on the high side and a velocity RMS is computed for the log. This value is then used to calibrate the SEISLOG amplitudes.

The next step is to scale velocity RMS. The ratio between the RMS of the SEISLOG velocities (abbreviated SLOG RMS) and the velocity RMS previously set or computed is calculated and used to scale the SEISLOG velocities making their RMS equal to that of the velocity RMS. The RMS scalings have the effect of compensating for density variations in the earth.

The next stage is determination of the low frequency source. The important stage of introducing low frequencies includes several options. When the SEISLOG study covers a limited geographical area, the low frequency components can be derived from a calibration log.

The more normal procedure is to use low frequencies derived from the TRUVEL program which is employed to extract the appropriate information from stacking velocities. The output of the TRUVEL program can be expressed as a polynomial curve, surface or hyper-surface. If a log is to be used for calibration, the first differences of the integrated sonic log are filtered to retain only those frequencies below the crossover point. The filtered log is integrated and an appropriate phase shift calculated to convert the log datum to the floating datum used for the SEISLOG. The resulting low frequencies are then passed to the modulation routine. The low frequency calibration is determined once for a run, but the phase shift is determined for each trace.

If the low frequency information is derived from the TRUVEL program, the polynomial appropriate for the position of each trace is evaluated and passed to the modulation routine. This step is identified as "evaluate TRUVEL polynomial for present location".

In "modulate low frequency", the appropriate low frequency signal is modulated by merely adding the previously calculated SEISLOG velocities to the low frequency signal. The result of this operation is the SEISLOG output which consists of a series of samples at uniform time increments, each sample expressing a velocity. The results must be displayed for use.

These results are plotted directly on an appropriate time scale (plot SEISLOG seismic time vs. velocity) to match a seismic reflection section. This display is used only for correlation of the SEISLOG information with the appropriate seismic section.

In parallel display stream is the step of converting velocity to transmit time. The normal sonic log is plotted as the transit time through each foot of formation on a linear scale of vertical depth. The reciprocals of all the SEISLOG velocities are calculated to obtain equivalent transit times.

In the "compute depth" step, the distance which would separate each time sample in the normal sedimentary section is computed by multiplying the sample spacing, in time, by the SEISLOG velocity for each sample. These intervals are then integrated to produce the appropriate depth for each sample.

The final result is plotted on a depth scale, normally 250 ft. per inch, against an interval-transit-time scale, normally 25 microseconds per foot per inch. These measurements are now in the form of a standard sonic log and can be correlated directly at appropriate geological points to corresponding sonic logs at the same scale.

Figure 8:
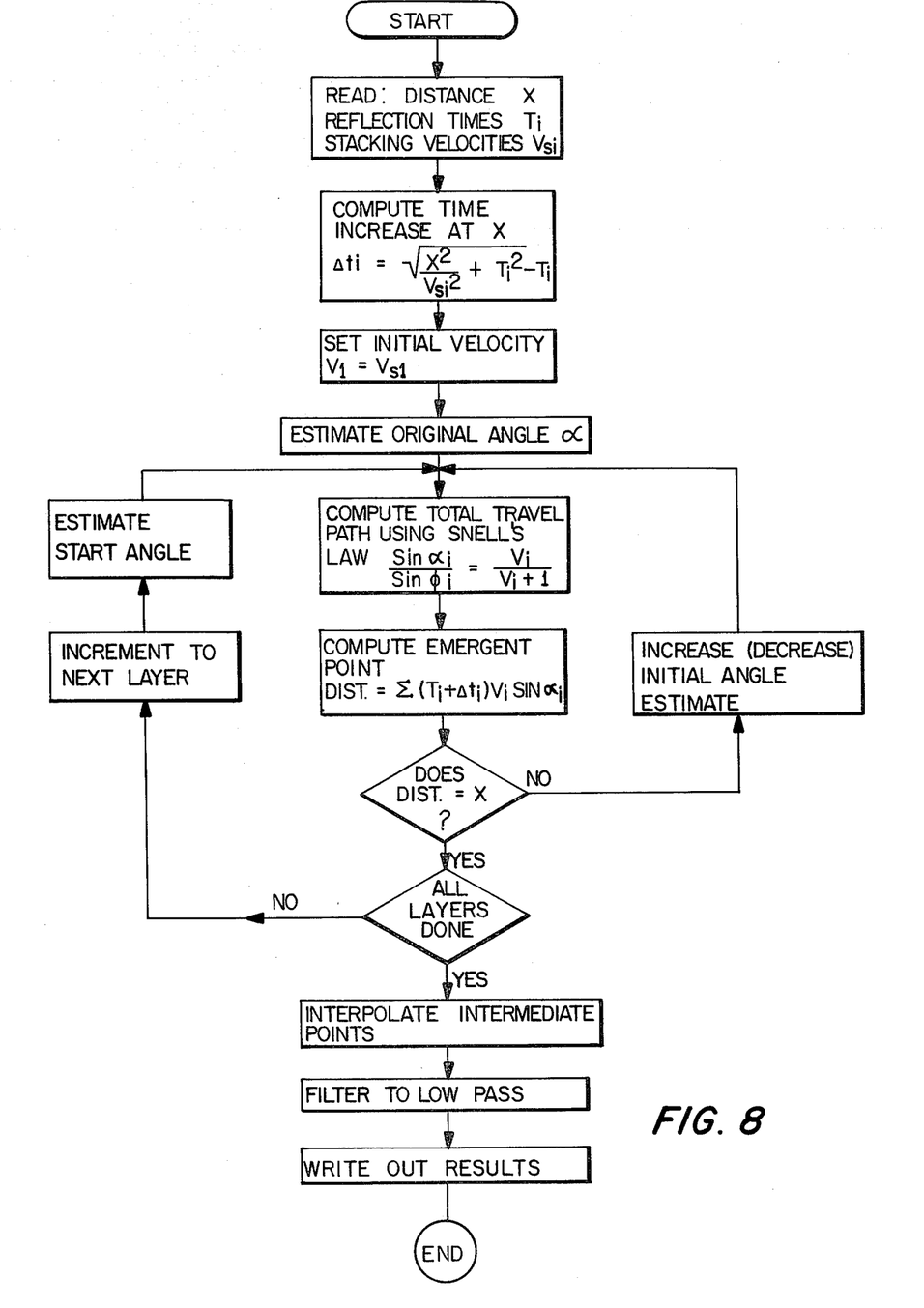

In FIG. 8 is shown a flow chart for the TRUVEL program, previously mentioned. The purpose of the TRUVEL program is to convert stacking velocities, which assume that reflections travel along straight line paths, to vertical velocities which are derived by assuming reflections which travel along segmented paths and which follow Snell's law producing a minimum time travel path in the transit through the sedimentary section.

The process, as shown in FIG. 8, begins with introduction of the input data as reflection time, i.e., stacking velocity pairs. These pairs, several of which will be input for each of several observation points, have been previously determined by an interpreter from the results of the standard stacking velocity analysis program.

The time increase is then computed. For some standard offset distance X, which is to be used throughout the program, the vertical reflection time and stacking velocity are used to compute the slant time to a receiver at distance X, assuming a straight line travel path. The difference between the vertical and slant times is determined.

In "set initial velocity", for each observation point, the initial velocity is assumed to be constant in a homogeneous medium. Therefore, the velocity at a distance point would be equal to the velocity at a vertical reflection point. Thus, the initial vertical velocity and the initial stacking velocity are equal. The first reflection is assumed to follow a straight line travel path which implies that the observed stacking velocity is not distorted by the effects of Snell's law as in the multilayered case. The initial angle alpha (a) is then estimated. At this stage the program goes into a double loop by which it evaluates the individual layer to produce a vertical velocity, and then cycles to calculate the next layer, and so on until all layers are calculated. The first stage is always to estimate an initial angle from which a trail path is calculated.

The total travel path to the nth layer is calculated using Snell's law to calculate all subsequent angles from the initial estimated angle. In "compute emergent point", the velocities previously computed, in the layers above the one being processed, the vertical and slant times in the layer being calculated, together with the calculated angles and simple sine and tangent relationship are used to calculate the total travel path. The emergent point, which is the sum of the horizontal displacements through each layer, is computed and then can be compared to distance X. A simple check is then made to determine if the emergent distance is equal to the required distance X. If this is not the case, an adjustment is made to the initial angle, smaller if the emergent point is too far and larger if the emergent point is too close. The routine then cycles through the travel path calculation and is tested once more.

Each time the proper emergent distance is obtained, Snell's law can be used to determine, from the velocity immediately above, the true vertical velocity in the layer to be determined. This calculation is done and the whole process incremented to the next layer, until all layers have been done.

In "interpolate intermediate points", a linear interpolation is applied to obtain intermediate points at uniform spacing to allow the application of appropriate filters. Either a frequency filter or a polynomial curve is then used to reduce the output to a suitable frequency range. The results are then written out on magnetic tape for input to the seislog program directly or, as is usually the case, to the polynomial surface fitting program which does further filtering and smoothing prior to utilization by SEISLOG.

FIG. 9 shows, in greater detail, the routine for direct recovery of transmission loss which is the second step appearing at the top of FIG. 5. In this routine, the data samples are first read. The data samples are normally demultiplexed seismic field recordings, as previously indicated, for which the amplitude has been measured at discrete time intervals, usually 0.001 seconds, 0.002 seconds, or 0.004 seconds, and recorded on digital magnetic tape. The data samples are read into a digital computer memory and stored as floating point numbers expressing the varying amplitudes of the recorded trace.

The short term running average is then computed. The absolute amplitudes of the seismic data samples (i.e., ignoring polarity) are smoother by convolving with a short term operator, usually 0.080 seconds long. The first differences are then computed. The smoothed absolute amplitudes are examined, by calculating the first differences, to determine whether the smoothed amplitude is rising or falling. At this point, the program goes into a loop and examines the amplitude of each sample of the seismic trace, computes a factor by which it should be scaled, and then scales it in determining the differential amplitude. The sign of the first difference sample is then determined. The first (Polarity +n−) difference is used to determine whether the smoothed absolute amplitude is rising or falling. Falling amplitude is indicated by negative polarity of the corresponding first difference sample and rising amplitude by positive polarity. If the amplitude is stationary or rising, no action is taken. If falling, a new gain recovery factor is computed.

The gain recovery factor is calculated by dividing some arbitrary standard amplitude (a program constant) by the amplitude of the corresponding sample from the smoothed absolute amplitude trace. The input is then scaled to a standard output. The original data sample is scaled, or multiplied by, the scale value currently assigned in the stages in which the sine of the first difference sample is determined and in which the gain recovery factor is calculated.

The data is then tested to be sure that all samples have been scaled. If not, a counter is incremented and the routine returns to determine the differential amplitude.

If the last sample has been computed, the program tests to see if all traces have been completed and then either cycles back to initiate the calculation of a new seismic trace or terminates the run.

This concludes this portion of the routine, the results of which are delivered to the deconvolution routine as previously described.

While certain advantageous embodiments have been chosen to illustrate the invention, it will be understood by those skilled in the art that various changes and modifications can be made therein without departing from the scope of the invention as defined in the appended claims.

What is claimed is:

1. A method of producing a display of the acoustic velocity characteristics of individual strata in a geologic section comprising the steps of:
   propagating acoustic energy through said section from a surface transmission station;
   detecting at least one receiving station at the surface of the earth acoustic energy reflected from interfaces within the section;
   recording signals representative of the amplitude of the received energy as a function of time;
   compensating the signals representative of energy reflected from each interface for the transmission losses due to transmission through the strata above that interface;
   filtering the compensated signals to remove signals having frequencies below a preselected frequency threshold;
   inverting the reflection coefficients to determine a series of velocity coefficients;
   providing signals below the preselected threshold representative of a gross velocity profile of the section;
   adding the compensated filtered velocity coefficient signals to the signals representative of gross velocity profile; and
   displaying the resulting added signals.

2. A method according to claim 1 wherein the step of displaying is immediately preceded by the step of:
   converting the added signals to 1/velocity as a function of depth.

3. A method according to claim 1 wherein the preselected low frequency threshold is between about 2 Hz. and about 8 Hz.

4. A method according to claim 1 wherein the step of providing signals below the preselected threshold includes the steps of:
   detecting at least one surface receiving station acoustic energy received at the receiving station as a function of time;
   sampling the recorded signals and determining the low frequency components thereof as a function of transit time and distance from the transmission station; and filtering the resulting signals to remove signals having frequencies above the preselected threshold to produce signals representative of a gross velocity profile of the section.

5. A method according to claim 1 wherein the step of providing signals below the preselected threshold includes:

providing a recording from borehold log of amplitude as a function of time for a geologic section similar to the geologic section being seismically studied;

filtering the recording to remove all frequencies above the preselected threshold to produce signals representative of a gross velocity profile of the section.

* * * * *